United States Patent [19]

Parker

[11] Patent Number: 4,526,249

[45] Date of Patent: Jul. 2, 1985

[54] FRONT SUSPENSION SYSTEM FOR A MOTORCYCLE

[76] Inventor: James G. Parker, 102 S. Capitol, Santa Fe, N. Mex. 87501

[21] Appl. No.: 498,164

[22] Filed: May 25, 1983

[51] Int. Cl.³ .................. B62K 21/02; B62K 25/16
[52] U.S. Cl. ................................ 180/219; 188/26; 280/275; 301/6 V
[58] Field of Search ............ 280/275, 277, 270, 276; 180/219; 188/26, 18 A; 301/6 V

[56] References Cited

U.S. PATENT DOCUMENTS

| | | | |
|---|---|---|---|
| 312,411 | 2/1885 | Wallace | 280/270 X |
| 913,961 | 3/1909 | Levedahl | 280/276 |
| 1,227,634 | 5/1917 | Lake | 280/276 |
| 2,497,121 | 2/1950 | Fletcher | 280/283 X |
| 2,792,236 | 5/1957 | Jacquart | 280/276 |
| 3,709,561 | 1/1973 | De Biasse | 301/6 V |
| 4,179,135 | 12/1979 | Slater | 280/276 |
| 4,180,280 | 12/1979 | Doveri | 280/286 X |
| 4,265,329 | 5/1981 | de Cortanze | 280/275 X |
| 4,398,741 | 8/1983 | Hiramatsu | 280/275 X |
| 4,431,204 | 2/1984 | Miyakoshi et al. | 280/277 |

FOREIGN PATENT DOCUMENTS

| | | | |
|---|---|---|---|
| 1056952 | 5/1959 | Fed. Rep. of Germany | 280/275 |
| 2494208 | 5/1982 | France | 180/219 |

OTHER PUBLICATIONS

*Le Liard et La Elf*, Moto Journal, 2/1983, p. 14.
*The Hossack Front Suspension*, Cycle World, 3/1983, pp. 82, 87 and 88.

*Primary Examiner*—John A. Pekar
*Attorney, Agent, or Firm*—William A. Eklund

[57] ABSTRACT

A suspension system for the front wheel of a motorcycle. A pair of upper and lower control arms extend forwardly from the body of the motorcycle and are attached by universally pivotable ball joints to a kingpin which extends along one side of the front wheel. The front wheel includes an offset hub and is journalled in a cantilevered arrangement to a bearing assembly which is affixed to the lower end of the kingpin and which is positioned at the center of the wheel. The control arms are hinged to the body and are appropriately sprung and damped so that the kingpin and front wheel swing vertically in suspension travel with respect to the body in response to weight and shock loads on the front wheel. The kingpin is connected to a handlebar assembly by means of a telescopic splined steering column. A variety of springing and damping mechanisms may be adapted to the suspension system. The system minimizes the tendency of the motorcycle to dive during hard braking of the front wheel, and also results in weight and shock loads being transmitted directly to points on the body which are low and close to the center of gravity of the motorcycle.

18 Claims, 18 Drawing Figures

FRONT SUSPENSION SYSTEM FOR A MOTORCYCLE

BACKGROUND OF THE INVENTION

The invention disclosed herein is generally related to motorcycles. More particularly, the present invention is related to suspension and steering systems for the front wheel of a motorcycle.

Modern motorcycles are equipped virtually universally with a fork-type front end suspension system. Such a system includes of a pair of telescoping fork tubes which contain internal springs and dampers. The fork tubes are connected through a head assembly to a rotatable steering column which is journalled to the frame of the motorcycle. The axle of the front wheel is journalled to the lower ends of the fork tubes. This simple structure has been a basic element of motorcycle design for almost a century. Nevertheless, the conventional fork design suffers from certain disadvantages which have long been recognized but which have never been completely overcome. For example, there is the well-known tendency of a motorcycle to "dive," or pitch forward and downward, during hard braking of the front wheel. This tendency has been partially but not adequately mitigated by the advent in recent years of complex anti-dive mechanisms, which operate essentially by increasing the compression pressure in the front fork shock absorbers during braking of the front wheel.

Further, there is a fundamental design problem which arises from the fact that the fork tubes must bear sizeable lateral loads and yet also slide smoothly in a telescoping manner during suspension travel. Lateral stresses exist because the fork is necessarily oriented with a "rake angle," i.e., the fork extends at an angle upwardly and rearwardly from the wheel axle to the steering column. A substantial rake angle is necessary and desirable to obtain satisfactory motorcycle steering response, and is also desirable because it renders the fork most effective in absorbing road shocks, which are directed both upward and rearward from the front wheel. However, the weight load of the motorcycle is purely vertical. If the fork is raked, this results in a lateral stress and consequent frictional resistance to suspension travel. This problem is normally resolved by using large-diameter sliding bushings in the telescoping fork tubes to bear such lateral stresses with a minimum of frictional resistance. As a result, however, the shock absorption performance of the fork tube suspension system varies with the weight and shock loads on the motorcycle.

As a general design principle, it is desirable that weight and shock loads on the front wheel be transmitted to and ultimately borne by the heaviest part of the motorcycle, namely the frame/engine structure comprising the central body of the motorcycle. It is also desirable that such loads be transmitted in the simplest and shortest possible manner in order to minimize the weight of the structures which must transmit and bear these loads. It is further desirable that such loads be borne at a point close to the center of gravity of the motorcycle so as to minimize the polar moment of inertia of the motorcycle and thereby minimize the tendency of the motorcycle to respond to road shocks with a forward pitching motion. Finally, it is desirable from the standpoint of stability to have the center of gravity of the motorcycle as low as possible and centered between the wheels.

In view of these design objectives, it will be recognized that one disadvantage of the fork-type suspension system is that that the load path from the front wheel to the body of the motorcycle must pass through the steering shaft and the associated steering head in which the steering shaft is journalled. This results in a load path which is angular and lengthy. It also requires the steering shaft, the steering head and their supporting structures to be considerably stronger and heavier than would otherwise be necessary to simply accommodate the torque necessary to effect steering, i.e. if a the major weight and shock load-bearing function were not also required. The angular load path also results in shock loads being transmitted to a high point on the frame, in the vicinity of the steering shaft, which is sufficiently far removed from the center of gravity of the motorcycle to result in undesirable pitching motion in response to road shocks. This response is in effect due to the large polar moment of inertia that results from absorbing road shocks at a point far from the center of gravity.

There is yet another disadvantage of the conventional telescopic fork suspension. This disadvantage arises from the fact that, because of the rake angle discussed above, the front wheel has a component of motion during suspension travel that is forward and rearward relative to the body of the motorcycle. Consequently, it is necessary to provide a considerable clearance between the front wheel and the body in order to allow for rearward motion of the front wheel in response to road shocks. In some cases this increases the wheel base of the motorcycle beyond that which would otherwise by desirable solely from the standpoint of performance considerations. In other cases it results in the engine and other body components being positioned close to the rear wheel in order to minimize the wheelbase, thereby resulting in the seat of the motorcycle being higher than may be desired.

Accordingly, it is the object and purpose of the present invention to provide an improved suspension and steering system for the front wheel of a motorcycle.

In this regard, it is a more specific object of the invention to provide in a motorcycle a front suspension system that transfers weight and shock loads in a direct path from the front wheel to a point on the motorcycle body that is low and close to the center of gravity of the motorcycle.

It is another object of the present invention to provide a suspension system in which there is maintained a substantially constant suspension geometry throughout the entire range of ordinary suspension travel.

It is also an object of the present invention, for reasons which will be apparent from the discussion below, to provide a front suspension system that is is one-sided; that is, which is positioned to one side of the front wheel, and with the wheel journalled in a cantilevered arrangement to facilitate removal of the front wheel from one side for maintenance or repair.

It is another object of the present invention to provide in a motorcycle a front suspension and steering system that minimizes bump-steer and diving.

It is yet another object of the invention to provide in a motorcycle a front suspension and steering system in which the travel of the front wheel in response to road shock is in a substantially vertical direction, thereby permitting other favorable design changes to be incorporated into the body of the motorcycle which have heretofore been prohibited in conventional designs by the requirements to provide for travel of the front wheel in a fore-and-aft direction.

Additional objects of the present invention include the provision of brake and spring/damper assemblies for the suspension system described below.

SUMMARY OF THE INVENTION

The foregoing and other objects are attained in the present invention, which provides a one-sided suspension system incorporating a parallelogram construction. The suspension system includes a kingpin which is positioned along one side of the front wheel, generally with a rake angle similar to that of the fork in a conventional forktype suspension. The wheel includes an axle which extends into and is journalled in a cantilevered arrangement in a bearing assembly at the lower end of the kingpin. The upper end of the kingpin extends around and terminates adjacent the outer periphery of the front wheel.

The front wheel includes a hub which is offset to one side to permit the bearing assembly at the lower end of the kingpin to be positioned at the geometric center of the wheel.

The kingpin is connected at its upper and lower ends to a pair of upper and lower weight-bearing control arms. In their normal rest positions, the control arms extend forwardly and approximately horizontally from the body of the motorcycle. The control arms are hinged to the body for vertical swinging motion. The lower control arm is arcuately shaped, extending outwardly from the body to one side so as to provide sufficient clearance for the front wheel to turn through its full range of steering motion.

Suspension travel of the front wheel, as in response to road shocks, is in a generally vertical direction. The kingpin travels in the same direction, maintaining a constant rake angle as a consequence of the parallelogram construction of the suspension system. Suspension travel of the front wheel is thus accompanied by vertical swinging motion of the control arms. The suspension travel may be controlled and damped by means of several types of shock absorption systems that can be adapted to the suspension system, some of which are described further below.

The two control arms are pivotably connected to the kingpin by means of ball joints or other equivalent connecting means that allow universal pivotal motion between the kingpin and the control arms. This is necessary in order to allow the front wheel and the kingpin to undergo vertical motion in response to road shock and to also undergo rotational steering motion about a steering axis that is positioned and oriented much the same as in a conventional motorcycle. In the preferred embodiment of the invention the kingpin is connected to a conventional motorcycle handlebar by means of two universal joints and a telescoping, splined steering column. Since the primary weight and shock loads on the front wheel are transmitted through the control arms directly to the body of the motorcycle, the steering column and supporting structures can be made of lighter construction than could otherwise be obtained in a conventional motorcycle design.

These and other aspects of the present invention are more fully set forth in the following detailed description and in the accompanying drawings of the invention.

BRIEF DESCRIPTION OF THE DRAWINGS

The accompanying drawings, which form a part of the specification, illustrate certain embodiments of the invention, and, when taken with the following detailed description, serve to explain the principles of the invention. In the drawings.

DETAILED DESCRIPTION OF THE INVENTION

Referring first to FIGS. 1 through 4, a preferred embodiment of the suspension and steering system of the present invention is illustrated as it might be installed in a relatively large touring, or street, motorcycle.

The motorcycle includes generally a front wheel 10 and a body 12. The body 12 is considered to include the engine and its supporting frame, which are illustrated only in simplified general form and which will be of various actual shapes and configurations depending on such factors as the make of the motorcycle and design considerations unrelated to the present invention. The body 12 illustrated in FIG. 1 also includes a radiator 14 and a fuel tank 16, which form no part of the present invention but which are shown for purposes which will be apparent from the discussion below.

Figure 1:
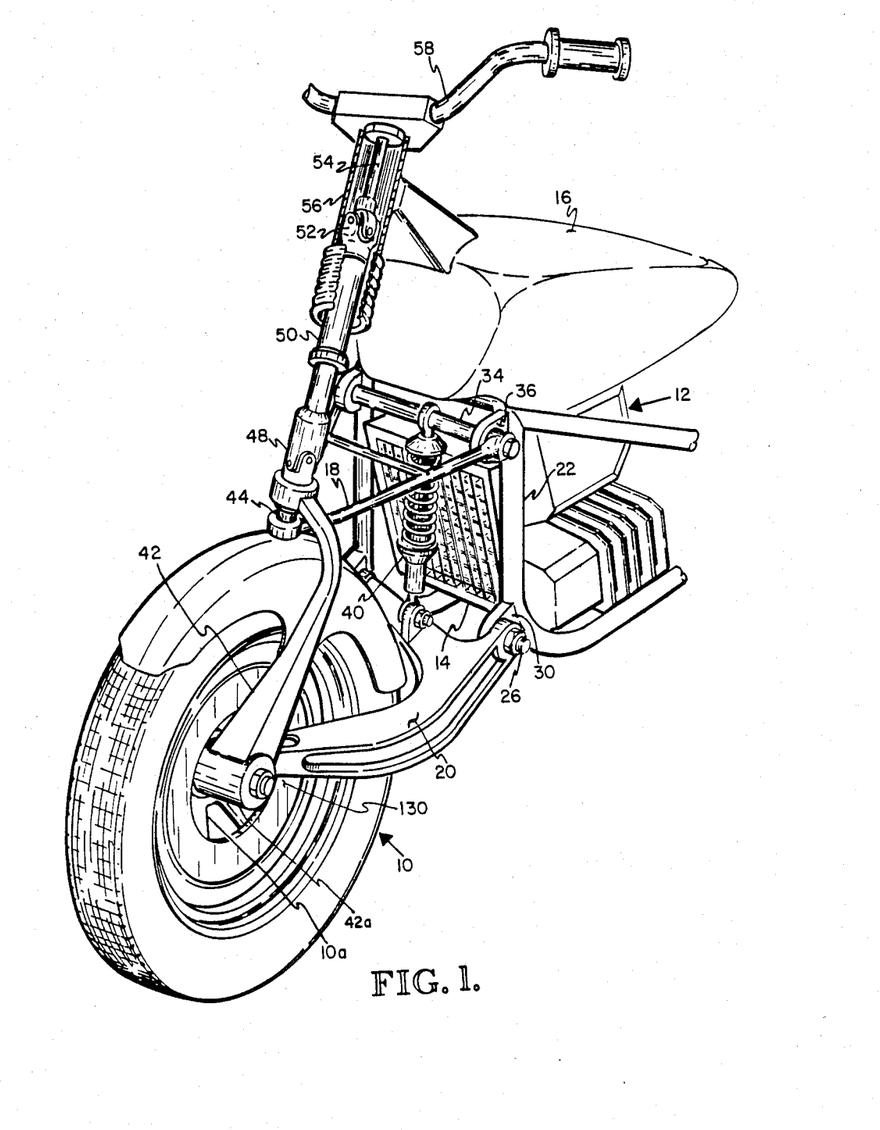
FIG. 1 is an isometric pictorial view of the front end of a motorcycle provided with the preferred embodiment of the front suspension and steering system of the present invention.

The suspension system of the present invention includes a triangular upper control arm 18 and an arcuately-shaped lower control arm 20 which are hinged to the body of the motorcycle for swinging motion. More specifically, the upper and lower control arms 18 and 20 are hinged to the frame of the motorcycle so as to swing in a vertical plane that extends along the longitudinal axis of the motorcycle. The lower control arm 20 is arcuate in shape to permit the front wheel 10 to rotate through its full range of steering motion, as described further below. In the illustrated embodiment, the control arms 18 and 20 are hinged to a pair of left and right tubular frame members 22 and 24 which form part of the motorcycle frame and which are in a location wherein they are commonly referred to in the trade as downtubes. The lower control arm 20 is journalled by means of appropriate bearing assemblies to a pair of pivot pins 26 and 28 which are affixed respectively to a pair of brackets 30 and 32 extending forwardly from the lower ends of the downtubes 22 and 24. The upper control arm 18 is also hinged to the downtubes 18 and 20 by means of a suitable bearing assembly, which in the illustrated embodiment includes a pivot shaft 34 mounted on brackets 36 and 38 at the upper ends of the downtubes 22 and 24. A spring-loaded damper 40, or shock absorber, is centrally positioned and connected between the pivot shaft 34 and the lower control arm 20.

The upper and lower control arms 18 and 20 are connected to a kingpin 42. The kingpin 42 extends generally along the left side of the front wheel 10 and is oriented so as to have a rake angle in much the same manner as the fork in a conventional motorcycle suspension. The upper end of the kingpin 42 curves around the outer periphery of the tire of the wheel 10, and terminates at a ball joint 44 which is centered in the plane of the wheel and which is positioned adjacent the outer circumferential periphery of the tire.

Figure 3:
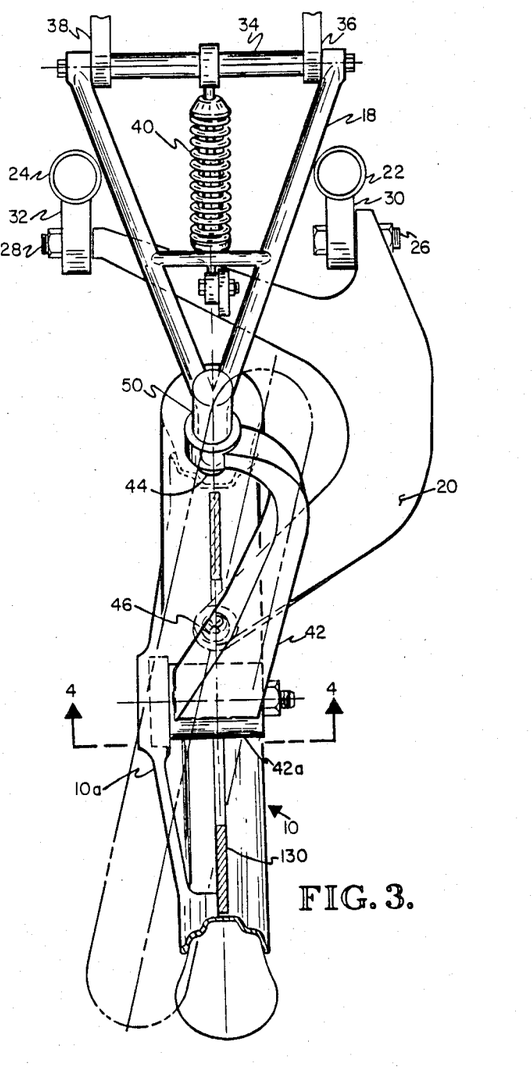
FIG. 3 is a top view in partial cross section of the suspension system of FIG. 1, taken along section line 3—3 of FIG. 2.
Figure 4:
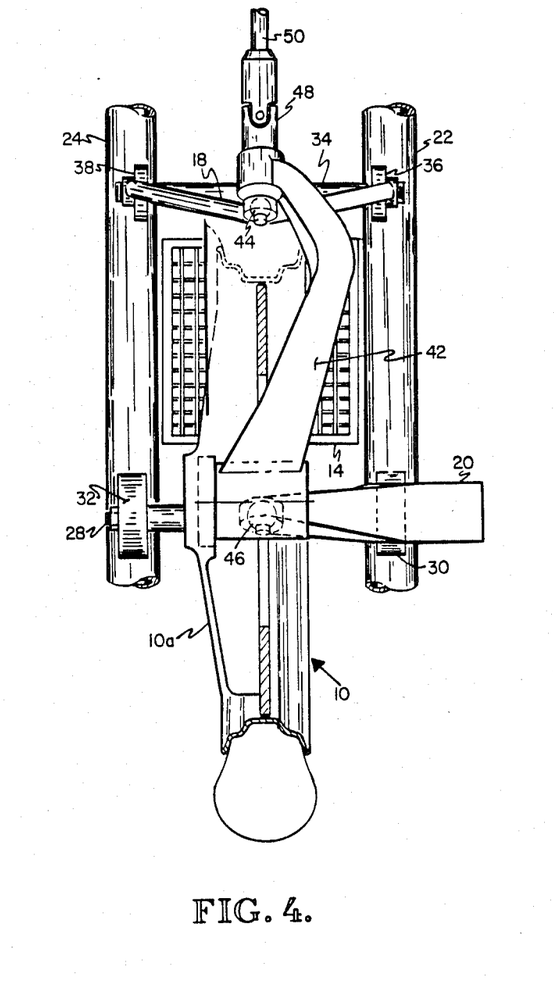
FIG. 4 is a front end view in partial cross section of the suspension system of FIG. 1, taken along section line 4—4 of FIG. 3.

The front wheel 10 includes a spoked hub 10a which is offset to one side of the center plane of the wheel, as best shown in FIGS. 3 and 4. In the illustrated embodiment, the hub 10a is integrally connected with the rim of the wheel, and is offset to the right side of the wheel, from the viewpoint of a person seated on the motorcycle. The hub 10a is affixed to a wheel axle (not shown) which extends into and is journalled in a bearing assembly 42a integrally formed in the lower end of the kingpin 42. In this regard, the lower end of the kingpin 42 extends into the center of the wheel, and the hub 10a is offset as described above, so that the bearing assembly 42a is located at the geometric center of the wheel.

Figure 2:
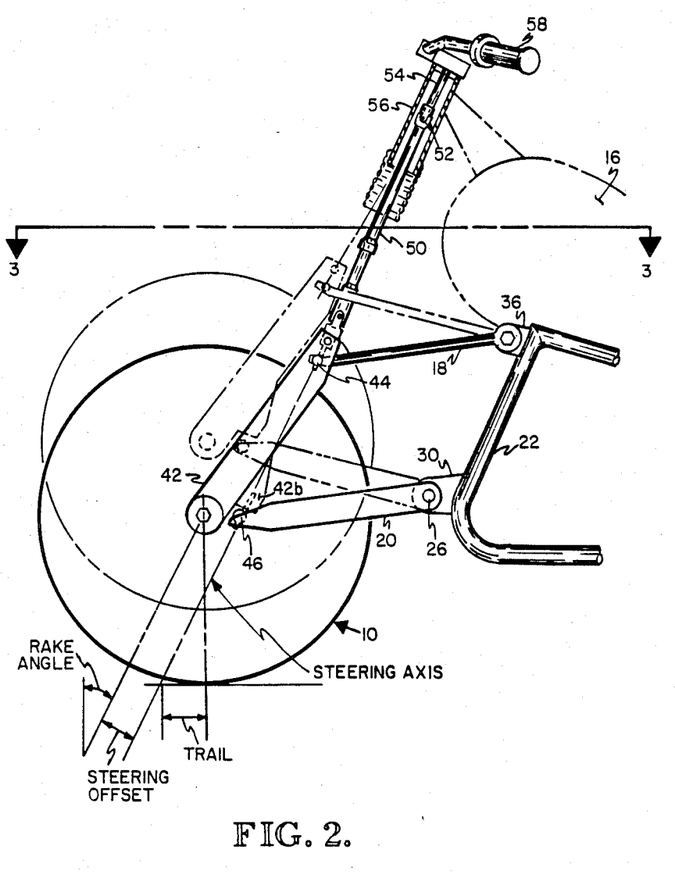
FIG. 2 is a side view of the embodiment shown in FIG. 1, with the displacement of the front wheel during suspension travel shown in phantom outline.

The control arms 18 and 20 are connected to the kingpin 42 by means of the upper ball joint 44 and a lower ball joint 46, which together permit universal pivotal motion between the kingpin and each of the control arms. The upper ball joint 44 connects the forward end of the upper control arm 18 to the upper end of the kingpin 42. The lower ball joint 46 connects the forward end of the lower control arm 20 to a bracket 42b (FIG. 2) which extends downwardly from the underside of the lower end of the kingpin 42. For reasons discussed below, the ball joints 44 and 46 lie in the central longitudinal plane of the motorcycle, which also corresponds with the center plane of the wheel 10 when in its unturned position. Additionally, the two ball joints 44 and 46 are positioned on and define a steering axis, illustrated in FIG. 2, about which the front wheel is rotated during steering. The steering axis has a rake angle, which is also shown in FIG. 2. The function of the bracket 42b is to provide what is known in the motorcycle industry as "steering offset" in the steering assembly. By this it is meant that the steering axis, which is defined by the line passing through the centers of the ball joints 44 and 46, passes not through the axle of the wheel but rather through a point to the rear of the axle, as shown in FIG. 2. The distance from the axle to the steering axis, measured in a direction perpendicular to the steering axis, is the "steering offset" of the steering assembly. The effect of a positive steering offset is to provide a self-centering tendency in the front wheel. The steering offset is also related to another parameter of motorcycle design known as the "trail" of the steering assembly, which is also shown in FIG. 2. The trail is the distance, measured along the ground, between the front wheel axle and the point where the steering axis intersects the ground. The trail is determined by the rake angle of the steering axis and the amount of the steering offset.

The upper end of the kingpin 42 is connected by means of a universal joint 48 to the lower end of a telescoping, splined steering shaft 50. The upper end of the steering shaft 50 is connected by means of a second universal joint 52 to a rotatable handlebar shaft 54. The handlebar shaft 54 is journalled in a steering head 56, or fixed bearing assembly, which may be mounted to the fuel tank assembly, as illustrated, or to any other fixed structure of the motorcycle body. A conventional handlebar assembly 58 is affixed to the handlebar shaft 54. For clarity of illustration, there are omitted in the drawings the headlamp, various pieces of instrumentation, control cables, and other components that would ordinarily be associated with the steering head and handlebar assembly.

The operation of the suspension system is illustrated best in FIG. 2. The suspension system is normally sprung and damped by means of a spring-loaded shock absorber such as the shock absorber 40 shown in FIGS. 1-4 or one of the alternative shock absorption systems described below and illustrated in the subsequent Figures. The normal resting position of the system is shown in solid lines in FIG. 2. In response to a weight load or a road shock, the front wheel moves upwardly to a position such as that shown in dashed outline in FIG. 2. It will be noted that the kingpin 42 maintains the same rake angle throughout its range of travel. It will also be noted that the travel of the wheel and the kingpin is primarily in a vertical direction, and that this travel is absorbed by the telescoping compression of the splined steering shaft 50. It will be further noted that the kingpin 42, the upper and lower control arms 18 and 20, and the downtubes 22 and 24 together form a parallelogram suspension system in which all weight and shock loads are transmitted in a direct path to the body of the motorcycle. More particularly, such loads are transmitted to points which are low on the body of the motorcycle and close to its center of gravity. The steering shaft 50 does not bear weight or shock loads, and is therefore designed to bear only the torque loads necessary for steering.

Figure 5:
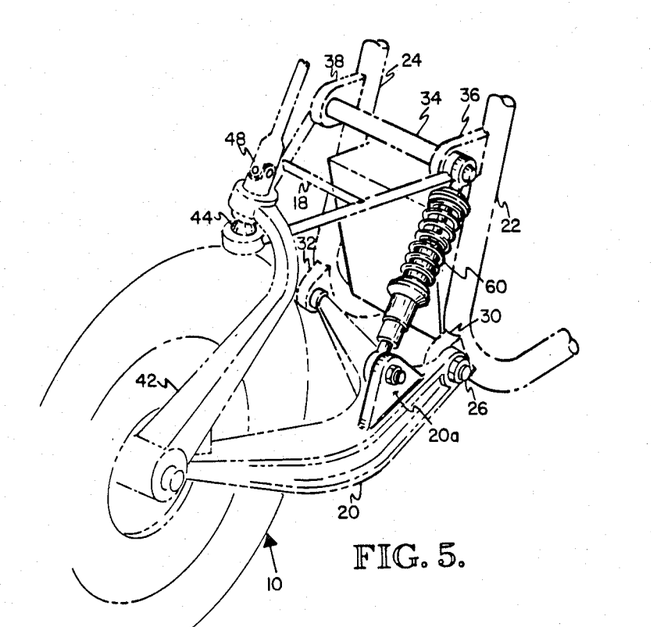
FIG. 5 is an isometric pictorial view of a suspension such as that shown in FIGS. 1-4, with a single spring-loaded shock absorber installed on one side of the lower control arm.
Figure 6:
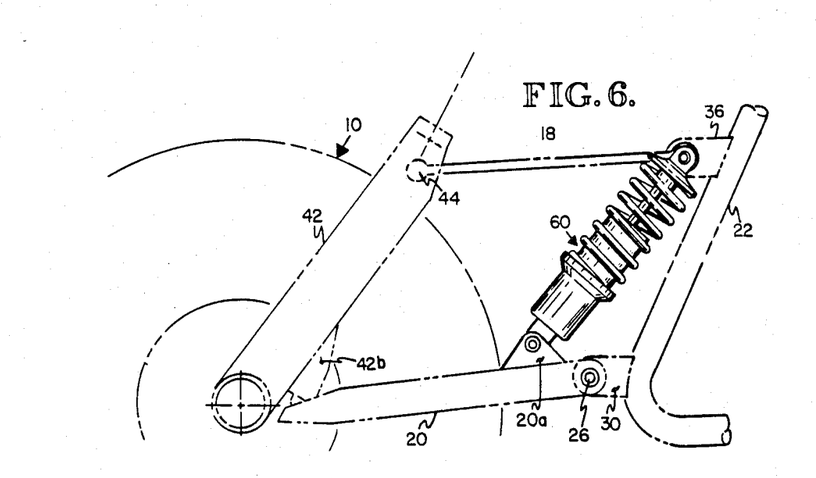
FIG. 6 is an orthographic side elevation view of the shock absorber and suspension system of FIG. 5.

Turning now to FIGS. 5 through 12, there are illustrated several possible mechanisms which incorporate springing and damping devices into the suspension system shown in FIGS. 1 through 4. For example, FIGS. 5 and 6 illustrate a preferred system in which a spring-loaded damper 60, or shock absorber, is installed between the left-hand side of the upper control arm pivot shaft 34 and a bracket 20a located on the left-hand side of the lower control arm 20. As illustrated, the shock absorber 60 is maintained in a state of compression so as to absorb weight and shock loads on the front wheel.

Figure 7:
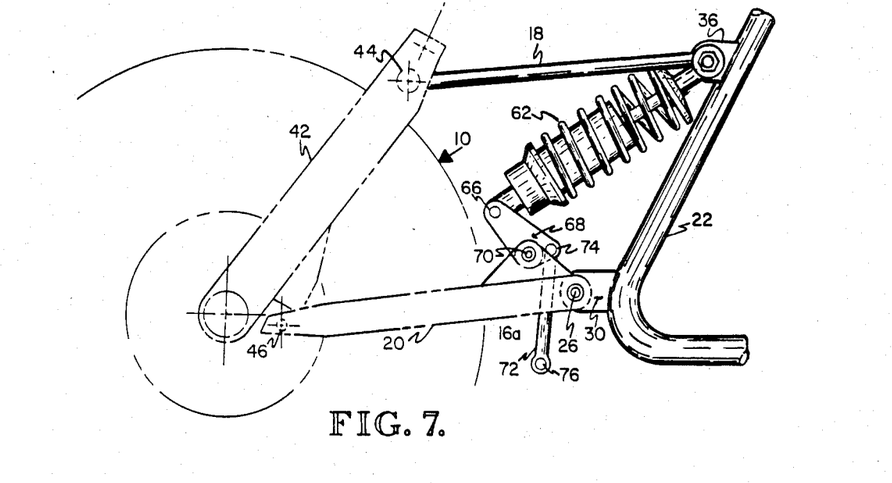
FIG. 7 is a side view of a spring-loaded shock absorber assembly with a progressive linkage.
Figure 8:
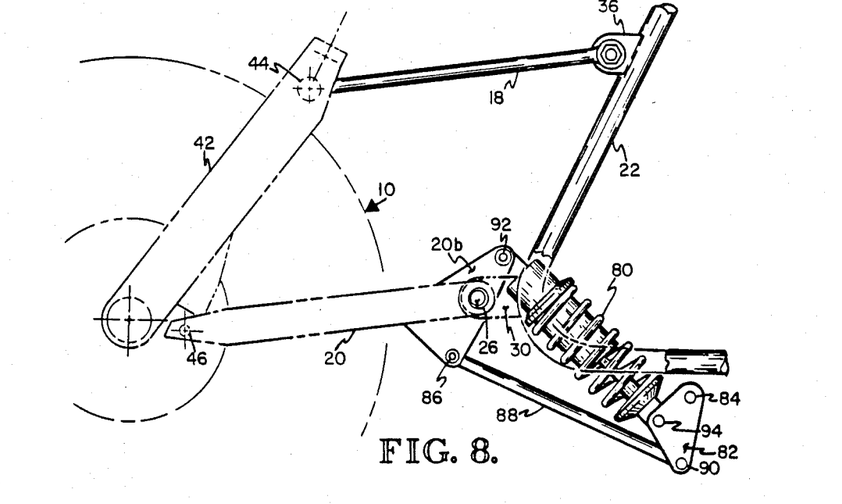
FIG. 8 is a side view of a second shock absorber assembly with a progressive linkage.

FIGS. 7 and 8 illustrate two different shock absorber installations, each of which utilizes a progressive linkage, that is, one in which the mechanical compressive forces on the shock absorber increase nonlinearly with the displacement of the suspension system. In FIG. 7, a spring-loaded shock absorber 62 is maintained in a state of compression to bear weight and shock loads on the front wheel. In the illustrated embodiment, the shock absorber 62 is pivotably connected at its upper end to the pivot shaft 34, although the shock absorber 62 may be alternatively coupled to any other fixed point on the motorcycle body. The lower end of the shock absorber 62 is connected by a pivot pin 66 to one end of a short lever arm 68. The lever arm 68 is pivotably connected at an intermediate point along its length by a pivot pin 70 to a bracket 20a on the lower control arm 20. The opposite end of the arm 68 is pivotably connected to a link 72 by a pivot pin 74, and the opposite end of the link 72 is connected to a fixed point on the motorcycle body by another pivot pin 76. It will recognized that upward swinging motion of the lower control arm 20 results in compression of the shock absorber assembly 62, and that the progressive nature of the illustrated mechanical arrangement results in a multiplication of the compressional displacement of the assembly 62 over that which is achieved in the arrangement shown in FIGS. 5 and 6.

FIG. 8 illustrates a spring-loaded shock absorber 80 which is compressed by means of a progressive linkage consisting of a bracket 20b integrally formed at the hinged end of the lower control arm 20 and a lever arm 82 which is hinged to a fixed point on the body of the motorcycle. The lever arm 82 is pivotably connected to the motorcycle body by a pivot pin 84. The integral bracket 20b on the control arm extends both upwardly and downwardly from the end of the arm 20. The lower extension of the bracket 20b is pivotably connected by a pivot pin 86 to one end of a rigid link 88. The other end of the rigid link 88 is connected to the free-swinging end of the lever arm 82 by a pivot pin 90. The shock absorber 80 is pivotably connected at its opposite ends to the upper extension of the bracket 20b, by a pivot pin 92, and to an intermediate point on the lever arm 82 by a pivot pin 94. As in the arrangement shown in FIG. 7, there is a mechanical multiplication of the compressive displacement of the shock absorber 80 upon upward swinging of the lower control arm 20 in response to weight or shock loads. One primary advantage of the arrangement shown in FIG. 8 is that the shock absorber 80 can be positioned low on the body of the motorcycle. As illustrated, the shock absorber 80 can be positioned immediately below and and in front of the engine of the motorcycle.

It will also be noted that the arrangements shown in FIGS. 7 and 8 may be implemented with either one shock absorber, as shown, or with two shock absorbers positioned in essentially identical configurations on the opposite sides of the motorcycle body.

Figure 9:
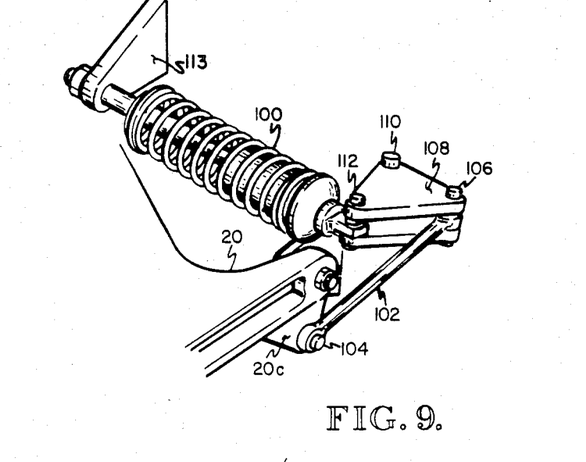
FIG. 9 is an isometric view of a suspension system with a transversely mounted shock absorber.
Figure 10:
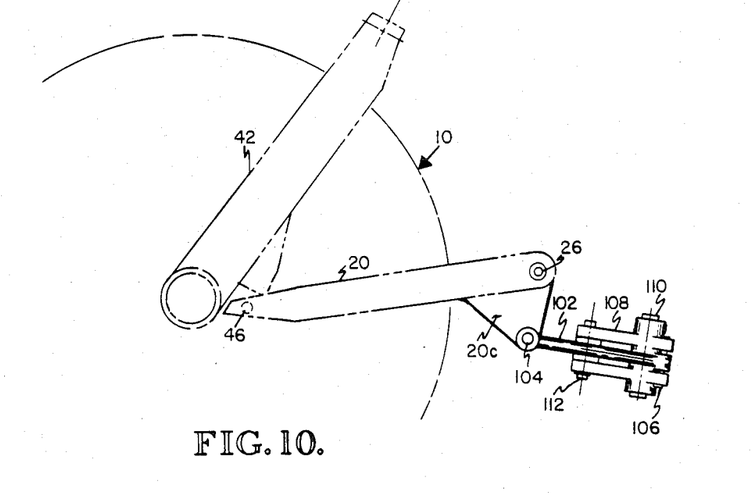
FIG. 10 is a side view of the suspension system shown in FIG. 9.

FIGS. 9 and 10 illustrate yet another springing and damping mechanism, in which weight and shock loads are transmitted to a spring-loaded shock absorber 100 which is mounted transversely on the body of the motorcycle. In this embodiment the rear end of the lower control arm 20 includes an integral, downwardly extending bracket 20c. The bracket 20c is connected to a one end of a rigid link 102 by a pivot pin 104. The opposite end of the link 102 is connected by a pivot pin 106 to a triangular linkage plate 108. The triangular plate 108 is hinged at one apex to the motorcycle body by a pivot pin 110, and is hinged at its other apex to one end of the transversely mounted shock absorber 100 by another pivot pin 112. The opposite end of the shock absorber 100 is connected to a fixed bracket 113 which is affixed to the body of the motorcycle. As with the embodiment shown in FIG. 8, the advantage of this embodiment is that the shock absorber 100 is mounted low on the motorcycle, below the front of the engine, and close to the center of gravity.

Figure 11:
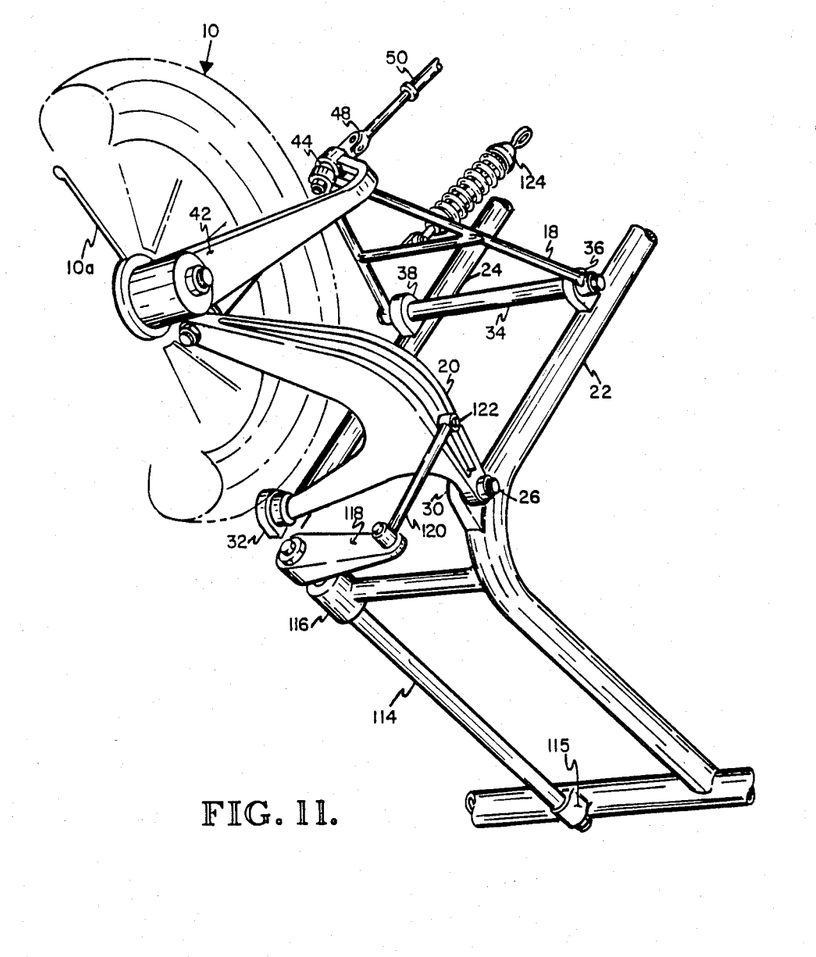
FIG. 11 is an isometric view, taken from below the motorcycle, of a shock absorption system which includes a longitudinal torsion bar as the active spring element, and a separate damper attached to the upper control arm.
Figure 12:
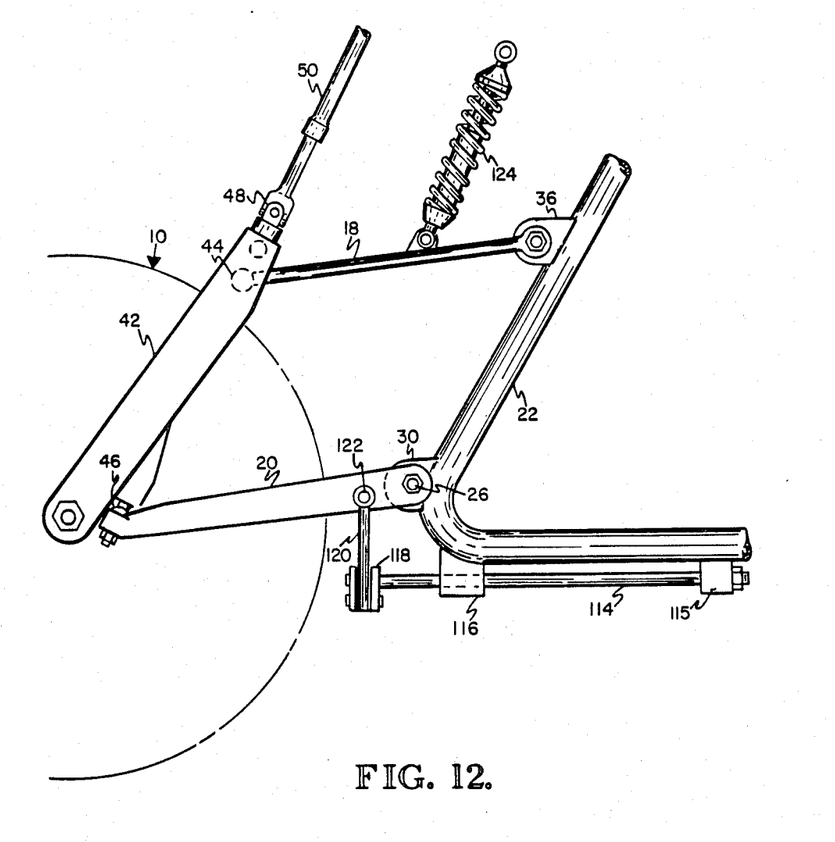
FIG. 12 is a side view of the shock absorption system shown in FIG. 11.

FIGS. 11 and 12 illustrate another shock absorption and springing system which utilizes a torsion bar 114 as the active spring element. The torsion bar 114 extends longitudinally and is centered beneath the engine of the motorcycle. As such, the torsion bar 114 is positioned so as to absorb weight and shock loads close to and below the center of gravity of the motorcycle. The rear end of the torsion bar 114 is secured against rotation by a clamp 115 affixed to the frame, and the forward end is journalled in a bushing assembly 116. The forward end of the torsion bar 114 is affixed to one end of a lever arm 118. The other end of the lever arm 118 is pivotably connected to one end of a link 120 which is pivotably connected at its opposite end to the lower control arm 20 by means of a pivot pin 122. A separate damper 124 is positioned between the upper control arm 18 and the frame of the motorcycle.

Figure 13:
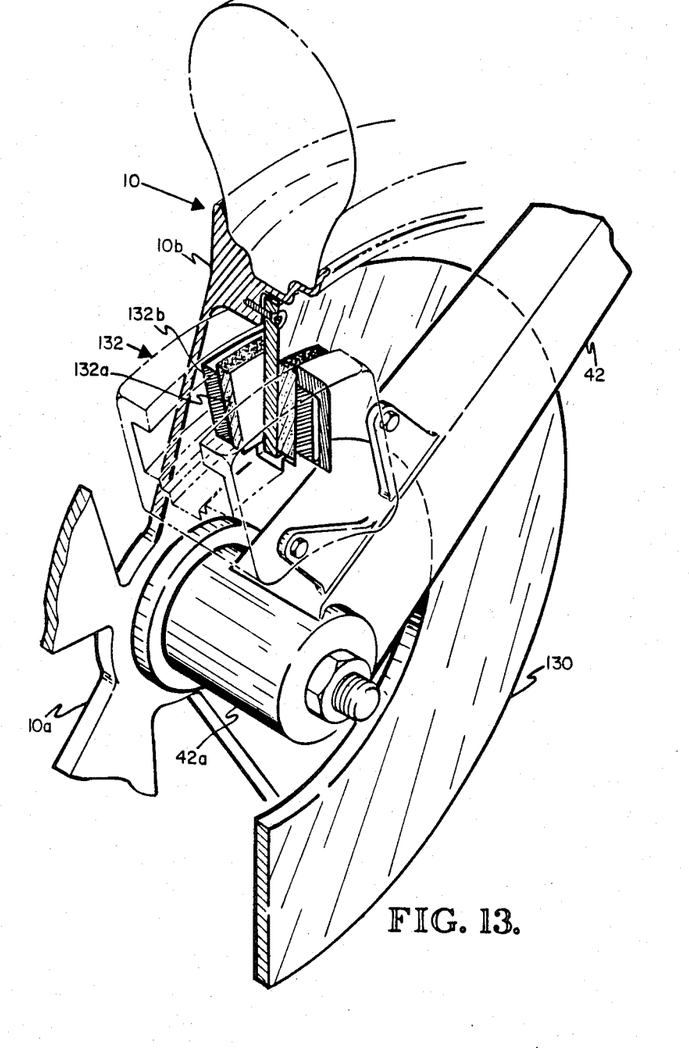
FIG. 13 is an isometric view of the preferred embodiment of a disk brake assembly installed in the suspension system of the present invention.
Figure 14:
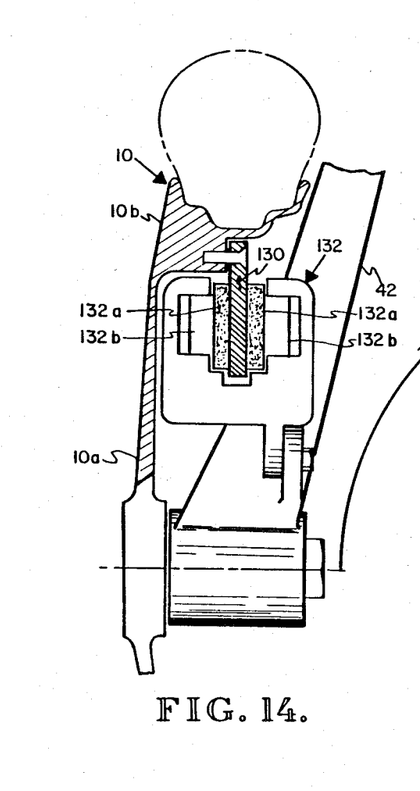
FIG. 14 is a front view in cross section of the disk brake system of FIG. 13.
Figure 15:
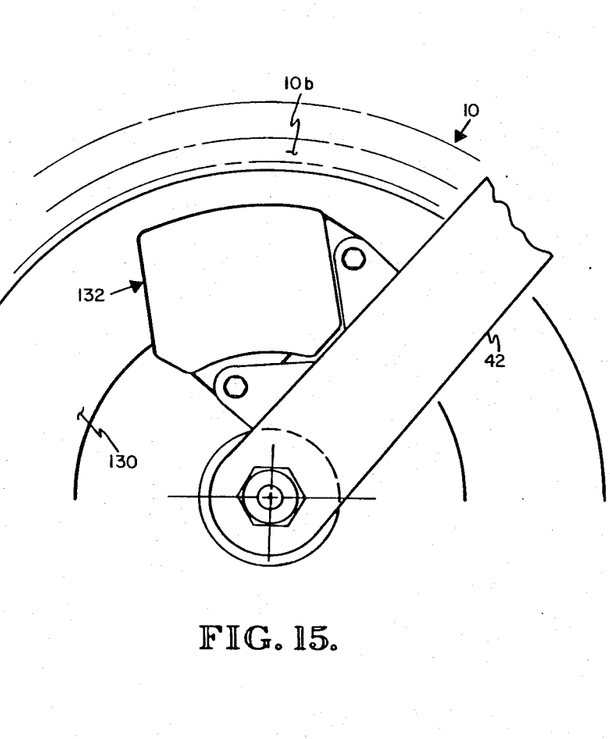
FIG. 15 is a side view of the disk brake system of FIG. 13.

Turning now to FIGS. 13 through 15, the suspension system of the present invention is particularly amenable to the installation of a highly efficient and novel brake assembly for the front wheel 10. In this application, the wheel 10 includes a rim 10b which is integral with the spoked hub 10a of the wheel. Affixed to the wheel rim 10b is an annular brake disk 130 (also shown in FIG. 1) which lies in the center plane of the wheel. It will be recalled that the wheel includes an offset hub 10a which allows the brake disk 130 to be so positioned. A hydraulic caliper brake assembly 132, including brake pads 132a and piston elements 132b, is mounted on the kingpin 42 so as to be engageable with the annular disk 130. The advantage of this arrangement is that the brake assembly 132 is located near the rim of the wheel, as opposed to being near the center of the wheel as is usually the case with conventional disk brake systems. As a result of this greater distance from the center of the wheel, the angular moment of force applied to the wheel by a given brake pressure is larger, and consequently a relatively smaller amount of force need be applied by the caliper assembly 132 to obtain a given braking effect. Thus, the brake assembly can operate under lower hydraulic pressures, at considerable advantage in terms of cost and performance.

Figure 16:
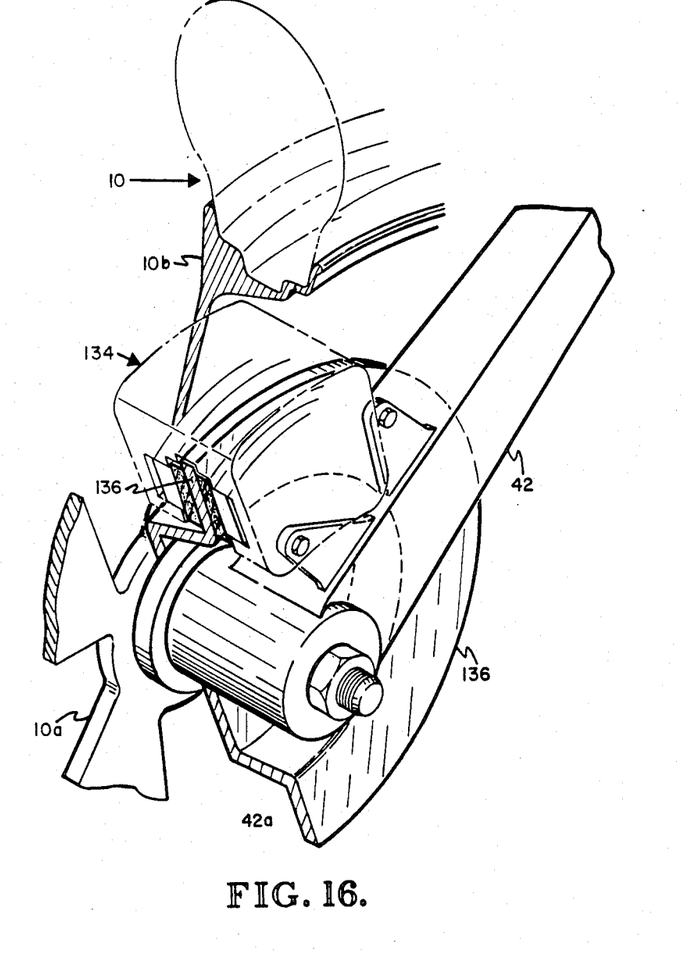
FIG. 16 is a pictorial isometric view of a second embodiment of a disk brake assembly for the suspension system.
Figure 17:
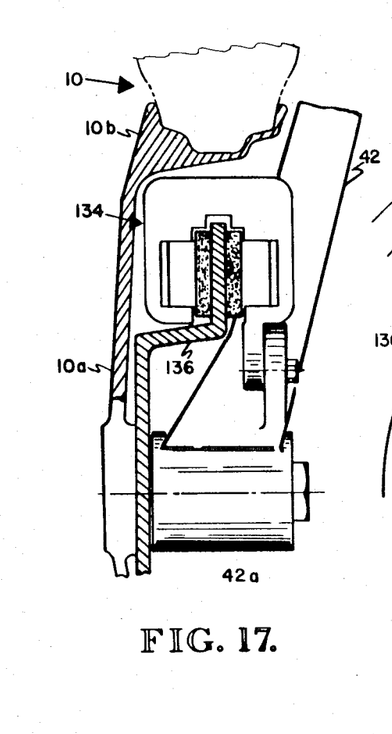
FIG. 17 is a front view in cross section of the disk brake assembly of FIG. 16.
Figure 18:
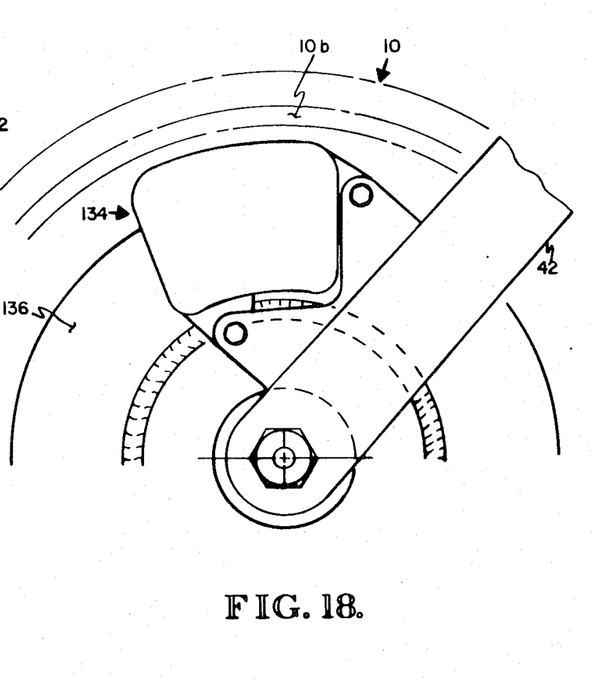
FIG. 18 is a side view of the disk brake assembly of FIG. 16.

FIGS. 16 through 18 illustrate an alternative embodiment of a brake assembly, in which a hydraulic caliper brake 134 is mounted on the kingpin 42 so as to be engageable with a brake disk 136 which is connected to the hub 10a of the front wheel 10. The brake disk 136 is formed so as to be centered in the plane of the wheel and the longitudinal center plane of the motorcycle, thereby resulting a centered brake force which does not introduce a steering torque into the front wheel upon braking, and thereby also avoiding the necessity of two balanced disks and associated caliper brakes on opposite sides of the wheel, which is the conventional approach to avoiding the steering torque resulting from an off-center disk brake.

It will be recognized that one of the advantages of the present invention over conventional fork suspension systems is that the rake angle is substantially constant throughout the range of suspension travel. This results in uniform steering center bias throughout the range of suspension travel.

Another advantage follows from the fact that the suspension travel of the front wheel is substantially vertical, as opposed to the diagonal upward and rearward motion of the front wheel in conventional suspension systems. This enables the front wheel to be placed closer to the engine and frame of the motorcycle, resulting in a shorter wheel base than can be obtained with conventional suspension systems. Alternatively, comparing motorcycles having equal wheelbases, the present invention allows the body of the motorcycle to be longer, thus enabling design variations that would not otherwise be possible. For example, the seat of the motorcycle can be placed lower on the frame, in the V-shaped notch between the rear wheel and the engine.

Another advantage is that the front end of the motorcycle does not "dive" on hard braking. This is because the front wheel travels only in a vertical direction, and thus does not undergo suspension travel as a result of braking forces, which are substantially horizontal in direction.

Yet another advantage of the suspension system is the fact that there is a direct load path to the frame from the front wheel. In a conventional fork suspension the load path is upwardly through the fork and steering column to the steering column bearing assembly, thence downwardly through the bearing assembly and supporting structure to the frame. In the conventional system all components of the load path must be sufficiently strong to bear the shock and suspension loads, and are therefore relatively heavy. Since the load path is substantially longer in the conventional system, this results in relatively heavier overall weight. Thus, the shorter and more direct load path in the suspension system of the present invention enables the overall weight of the motorcycle to be reduced, all other factors being equal.

With further regard to the configuration of the load path, it will be noted that the shock and suspension loads are not multiplied in the present system, as they are in a conventional fork system. In a conventional fork system, the angular configuration of the load path results in multiplication of the loads at the structure constituting the bend in the load path. This requires supporting structure to be incorporated, ordinarily around the steering column bearing assembly, which adds weight to the motorcycle at a point high on the frame, all of which is undesirable from a design standpoint.

The present invention also provides lower frictional resistance to suspension movement. In a conventional fork suspension system, the telescoping suspension forks undergo relative sliding motion in response to road shocks, while subjected at the same time to an appreciable lateral load which arises from the road shock as well as the weight load of the motorcycle. Due to the rake angle of the forks, these latter loads bear appreciably on the telescoping forks in a lateral direction. This results in substantial friction between the telescoping tubular elements of the fork, which are ordinarily separated by a large-diameter sliding seal. This friction is absent in the suspension system of the present invention, since the only sliding element, the steering column, is not subjected to a lateral weight load.

The present invention is also particularly amenable to the installation of springing and damping devices of various types, as illustrated in the various Figures. In this regard, the present invention is somewhat more flexible than the conventional fork system, wherein springing and damping devices must ordinarily be incorporated into the telescoping fork elements. Further in this regard, the suspension system of the present invention may be readily equipped with springing and damping devices that have progressive, or variable, response characteristics.

Another advantage of the present invention over other proposed kingpin-based systems is the absence of "bumpsteer." This advantage is obtained because the steering mechanism does not change geometry as it undergoes suspension travel or steering travel.

Yet another advantage of the present invention is its lower resistance to air flow to the engine, particularly the upper part of the engine. This enables the more efficient operation of a radiator, cooling fins, or other cooling devices located atop the engine.

Finally, there is the readily apparent advantage of being able to remove and service the front wheel without raising the front end of the motorcycle.

The present invention is described and illustrated herein with reference to certain preferred embodiments, including illustrations thereof. These descriptions and illustrations are for the purpose of disclosing the invention and teaching those of ordinary skill in the art how to make and use the invention. Various modifications, substitutions and alterations may be made without departing from the essential invention. Accordingly, the scope of the patent protection being sought is defined by the following claims.

The embodiments of the invention for which patent protection is claimed are defined as follows:

1. In a motorcycle having a body and a front wheel, a front suspension and steering system comprising a kingpin having upper and lower ends and extending along one side of said front wheel, a lower control arm, an upper control arm, and a telescoping steering shaft, said lower control arm having first and second ends and being hinged at said first end to said body for swinging motion in a substantially vertical plane, said second end of said lower control arm being connected for universal pivotal motion to said lower end of said kingpin, said front wheel being journalled to said lower end of said kingpin by means of a cantilevered axle assembly extending from one side of said lower end of said kingpin, said lower control arm being arcuately shaped so as to provide clearance for steering motion of said front wheel by rotation of said kingpin, said upper control arm having first and second ends, said first end of said upper control arm being hinged for swinging motion in a substantially vertical plane to said body of said motorcycle, said second end of said upper control arm being connected for universal pivotal motion to said upper end of said kingpin, said upper and lower control arms extending substantially horizontally from said body while in their resting positions, the points of universal pivotal connection between said kingpin and said second ends of said upper and lower control arms lying on a a steering axis that extends upwardly and rearwardly from said axle assembly of the front wheel, said telescoping steering shaft having a lower end connected for universal pivotal motion to said upper end of said kingpin, whereby said body, kingpin and upper and lower control arms form a parallelogram suspension system that translates road shock loads on said front wheel to vertical swinging motion of said control arms, kingpin and front wheel.

2. The suspension system defined in claim 1 further comprising an annular disk brake system, wherein said front wheel includes a rim and an annular disk affixed to said rim, and a caliper hydraulic brake assembly affixed to said kingpin and positioned to be engageable with said disk.

3. The suspension system defined in claim 1 further comprising a spring-loaded shock absorber mounted in compression between said lower control arm and a fixed point on the motorcycle body.

4. The suspension system defined in claim 1 further comprising a disk brake system, wherein said wheel includes an integral disk and further comprising a caliper brake assembly mounted on said kingpin and positioned to be engageable with said disk.

5. The suspension system defined in claim 1 further comprising a spring-loaded shock absorber mounted transversely in compression in said body, and wherein said shock absorber is connected by means of a mechanical linkage to said lower control arm.

6. The suspension system defined in claim 1 further comprising a longitudinal torsion bar coupling said lower control arm to the body of the motorcycle to provide springing of the suspension system, and a hydraulic damper coupled between one of said control arms and said body of said motorcycle to provide shock absorption.

7. The suspension system defined in claim 1 wherein said upper and lower control arms are hinged to a pair of downtubes forming part of the frame of said motorcycle.

8. The suspension system defined in claim 1 wherein said upper control arm is triangular in shape and includes three apexes, with said upper control arm being pivotably connected to said kingpin at a forward apex and being hinged to the motorcycle body at the other two apexes.

9. The suspension system defined in claim 1 wherein said motorcycle includes a longitudinal vertical center plane, and wherein said lower control arm is hinged to said body of the motorcycle at two points which are spaced apart and are located at opposite sides of and at substantially equal distances from said center plane, and wherein said lower control arm is pivotably connected to said kingpin by means of a ball joint, said ball joint lying in said longitudinal center plane of the motorcycle.

10. In a motorcycle having a body which includes an engine and a frame, a front suspension and steering system comprising a front wheel having an offset hub, a kingpin having upper and lower ends and extending along one side of said front wheel, a lower control arm, an upper control arm, and a telescoping steering shaft, said lower control arm having first and second ends and being hinged at said first end to said body for swinging motion in a substantially vertical plane, said second end of said lower control arm being connected for universal pivotal motion to said lower end of said kingpin, said front wheel being journalled to said lower end of said kingpin by means of a cantilevered axle assembly extending from one side of said lower end of said kingpin, said lower control arm being arcuately shaped so as to provide clearance for steering motion of said front wheel by rotation of said kingpin, said upper control arm having first and second ends, said first end of said upper control arm being hinged for swinging motion in a substantially vertical plane to said body of said motorcycle, said second end of said upper control arm being connected for universal pivotal motion to said upper end of said kingpin, said telescoping steering shaft being connected by universal joint means to said upper end of said kingpin, said upper and lower control arms extending substantially horizontally from said body while in their resting positions, whereby said body, kingpin and upper and lower control arms form a parallelogram suspension system that translates road shock loads on said front wheel to vertical swinging motion of said control arms, kingpin and front wheel.

11. The suspension system defined in claim 10 further comprising an annular disk brake system, wherein said front wheel includes a rim and an annular disk affixed to said rim, and a caliper hydraulic brake assembly affixed to said kingpin and positioned to be engageable with said disk.

12. The suspension system defined in claim 10 further comprising a spring-loaded shock absorber mounted in compression between said lower control arm and a fixed point on the motorcycle body.

13. The suspension system defined in claim 10 further comprising a disk brake system, wherein said wheel includes an integral disk and further comprising a caliper brake assembly mounted on said kingpin and positioned to be engageable with said disk.

14. The suspension system defined in claim 10 further comprising a spring-loaded shock absorber mounted transversely in compression in said body, and wherein said shock absorber is connected by means of a mechanical linkage to said lower control arm.

15. The suspension system defined in claim 10 further comprising a longitudinal torsion bar coupling said lower control arm to the body of the motorcycle to provide springing of the suspension system, and a hydraulic damper coupled between one of said control arms and said body of said motorcycle to provide shock absorption.

16. The suspension system defined in claim 10 wherein said upper and lower control arms are hinged to a pair of downtubes forming part of the frame of said motorcycle.

17. The suspension system defined in claim 10 wherein said upper control arm is triangular in shape and includes three apexes, with said upper control arm being pivotably connected to said kingpin at a forward apex and being hinged to the motorcycle body at the other two apexes.

18. The suspension system defined in claim 10 wherein said motorcycle includes a longitudinal vertical center plane, and wherein said lower control arm is hinged to said body of the motorcycle at two points which are spaced apart and are located at opposite sides of and at substantially equal distances from said center plane, and wherein said lower control arm is pivotably connected to said kingpin by means of a ball joint, said ball joint lying in said longitudinal center plane of the motorcycle.

* * * * *